US 9,088,791 B2

(12) United States Patent
Gross

(10) Patent No.: US 9,088,791 B2
(45) Date of Patent: Jul. 21, 2015

(54) TRANSPARENT AUTOSTEREOSCOPIC IMAGE DISPLAY APPARATUS AND METHOD

(75) Inventor: Markus Gross, Zürich (CH)

(73) Assignee: Eidgenossische Technische Hochschule Zurich, Zurich (CH)

( * ) Notice: Subject to any disclaimer, the term of this patent is extended or adjusted under 35 U.S.C. 154(b) by 636 days.

(21) Appl. No.: 13/510,192

(22) PCT Filed: Nov. 16, 2010

(86) PCT No.: PCT/CH2010/000285
§ 371 (c)(1),
(2), (4) Date: Aug. 21, 2012

(87) PCT Pub. No.: WO2011/060561
PCT Pub. Date: May 26, 2011

(65) Prior Publication Data
US 2012/0314017 A1 Dec. 13, 2012

(30) Foreign Application Priority Data
Nov. 17, 2009 (CH) ........................ 1775/09

(51) Int. Cl.
H04N 7/14 (2006.01)
H04N 13/04 (2006.01)
G02B 27/22 (2006.01)

(52) U.S. Cl.
CPC ........ *H04N 13/0459* (2013.01); *G02B 27/2214* (2013.01); *H04N 13/0413* (2013.01)

(58) Field of Classification Search
USPC ...................................... 348/14.07
See application file for complete search history.

(56) References Cited

U.S. PATENT DOCUMENTS 1,698,221 A 1/1929 Craig
5,493,427 A 2/1996 Nomura et al.
(Continued)

FOREIGN PATENT DOCUMENTS

JP 772445 A 3/1995
JP 980354 A 3/1997
JP 2004248212 A 9/2004

OTHER PUBLICATIONS

Agrawala et al., The Two-User Responsive Workbench: Support for Collaboration Through Individual Views of a Shared Space, ACM, 1997, 6 pages.
(Continued)

Primary Examiner — Joseph J Nguyen
(74) Attorney, Agent, or Firm — The Webb Law Firm

(57) ABSTRACT

An image display apparatus includes a display layer and an image separation layer. The image separation layer is adapted to separate a displayed image on the display layer into a first image for a left eye of an observer and into a second image for a right eye of an observer. This renders the image display apparatus autostereoscopic. In order to improve the appearance of the displayed image, the apparatus is adapted to activate the display layer and the image separation layer substantially only within a given two-dimensional silhouette and to remain substantially transparent outside of the silhouette. In other aspects, the apparatus may be adapted to dynamically adjust an observation angle between the first image and the second image by controlling the distance between the display layer and the image separation layer by an actuator. The apparatus may be mounted on a robotic unit.

7 Claims, 2 Drawing Sheets

(56) References Cited

U.S. PATENT DOCUMENTS

| | | | |
|---|---|---|---|
| 5,661,599 A * | 8/1997 | Borner | 359/463 |
| 5,956,180 A * | 9/1999 | Bass et al. | 359/479 |
| 6,069,649 A * | 5/2000 | Hattori | 348/51 |
| 6,163,336 A * | 12/2000 | Richards | 348/42 |

OTHER PUBLICATIONS

Billinghurst et al., Collaborative Augmented Reality, Communications of the ACM, Jul. 2002, pp. 64-70, vol. 45, No. 7.

Gross et al., blue-c: A Spatially Immersive Display and 3D Video Portal for Telepresence, ACM Transactions on Graphics, 2003, pp. 819-827.

Hou et al., Comparative Evaluation of Display Technologies for Collaborative Design Review, Presence, Apr. 2009, pp. 125-138, vol. 18, No. 2.

Kauff et al., An Immersive 3D Video-Conferencing System Using Shared Virtual Team User Environments, CVE, 2002, pp. 105-112.

Kitamura et al., Interactive Stereoscopic Display for Three or More Users, ACM SIGGRAPH, Aug. 2001, pp. 231-239.

Machino et al., Remote-Collaboration System Using Mobile Robot with Camera and Projector, Proceedings of the 2006 IEEE International Conference on Robotics and Automation, May 2006, pp. 4063-4068.

Nozick et al., Online Multiple View Computation for Autostereoscopic Display, PSIVT, 2007, Lecture Notes in Computer Science 4872, pp. 399-412, Springer-Verlag, Berlin, Germany.

Perlin et al., An Autostereoscopic Display, SIGGRAPH, 2000, pp. 319-326.

Raskar et al., The Office of the Future: A Unified Approach to Image-Based Modeling and Spatially Immersive Displays, SIGGRAPH, Jul. 1998, 10 pages.

http://office.microsoft.com/livemeeting (accessed: Aug. 27, 2009).

http://www.skype.com (accessed: Aug. 27, 2009).

http://dti3d.com (accessed: Aug. 27, 2009).

\* cited by examiner

TRANSPARENT AUTOSTEREOSCOPIC IMAGE DISPLAY APPARATUS AND METHOD

BACKGROUND OF THE INVENTION

1. Field of the Invention

The present invention relates to a transparent autostereoscopic image display apparatus, enabling, e.g., an improved telepresence, and to corresponding methods.

2. Description of Related Art

A variety of technologies related to telepresence and telecollaboration are known. A recent comparative evaluation of different display technologies for collaborative design review can be found in the report [Hou09] (Ming Hou, Justin G. Hollands, Andrea. Scipione, Lochlan Magee, Mike Greenley: "Comparative Evaluation of Display Technologies for Collaborative Design Review", Presence, Vol. 18, No. 2, 125-138, April 2009).

The simplest form of videoconferencing can be achieved with a standard PC with a 2D monitor, a video camera, and equipment for audio recording and playback. Prominent examples for these types of systems are Microsoft Livemeeting (http://office.microsoft.com/livemeeting, accessed: Aug. 27, 2009), Skype (http://www.skype.com, accessed: Aug. 27, 2009), or similar software suites. While such systems work reasonably well for basic communication between two persons, they are less suitable to support collaboration between larger groups. Moreover, they provide only a partial, 2D video of the remote person. Natural full body interaction including 3D appearance, gestures, or eye contact is impossible to achieve.

More realistic 3D visualization can be achieved by using stereo displays. Simple stereo displays for single persons ([Hou09]) require additional equipment such as LCD-based or polarized glasses and additional head tracking and hence are obtrusive for the viewer.

Autostereoscopic displays can produce a 3D image without requiring such additional equipment. Such displays are known, e.g., from [Perlin00] (Ken Perlin, Salvatore Paxia, Joel S. Kollin: "An autostereoscopic display", SIGGRAPH 2000, pp. 319-326, 2000), from DTI (http://dti3d.com, accessed: Aug. 27, 2009), or from [Kitamura01] (Yoshifumi Kitamura, Takashige Konishi, Sumihiko Yamamoto, Fumio Kishino: "Interactive stereoscopic display for three or more users", SIGGRAPH 2001, pp. 231-240, 2001). However, due to fixed lenticular lenses or parallax barriers, they are restricted to a very small, discrete set of different viewing positions and a small working area. Moreover, both types of displays are generally only available as desktop monitors. Displaying collaborating persons in their actual size and in 3D is impossible with current standard display technology.

Collaborative work can be improved by using virtual workbenches known from [Agrawala97] (Maneesh Agrawala, Andrew C. Beers, Ian McDowall, Bernd Fröhlich, Mark T. Bolas, Pat Hanrahan: "The two-user Responsive Workbench: support for collaboration through individual views of a shared space", SIGGRAPH 1997, pp. 327-332, 1997), augmented reality techniques known from [Billinghurst02] (Mark Billinghurst, Hirokazu Kato: "Collaborative augmented reality", Commun. ACM 45(7), pp. 64-70, 2002), or robotics, see [Machino06] (Tamotsu Machino, Satoshi Iwaki, Hiroaki Kawata, Yoshimasa Yanagihara, Yoshito Nanjo, Kenichiro Shimokura: "Remote-collaboration System using Mobile Robot with Camera and Projector", IEEE International Conference on Robotics and Automation, pp. 4063-4068, 2006), which embed the actions or instructions of the virtual collaborator visually into the real world.

Due to this integration into the actual working environment, collaborative tasks can be performed in a more natural, unobtrusive way. But in many augmented reality application scenarios, persons still have to wear specialized display and tracking devices such as a head mounted display. Moreover, these types of systems focus on embedding purely virtual objects into the real view of a person. An integration of a fully realistic 3D rendering of the collaborating person is currently infeasible with such systems.

Proposals for larger scale systems to embed collaborating persons virtually into real office or working environments are generally based on complex multi-camera and multi-projector systems such as the one known from [Raskar98] (Ramesh Raskar, Greg Welch, Matt Cutts, Adam Lake, Lev Stesin, Henry Fuchs: "The Office of the Future: A Unified Approach to Image-based Modeling and Spatially Immersive Displays", SIGGRAPH 1998, pp. 179-188, 1998) or [Kauff02] (Peter Kauff, Oliver Schreer: "An immersive 3D video-conferencing system using shared virtual team user environments", CVE 2002, pp. 105-112, 2002).

The most advanced, large-scale telecollaboration system up to date has been the blue-c project described in [Gross03] (Markus H. Gross, Stephan Würmlin, Martin Näf, Edouard Lamboray, Christian P. Spagno, Andreas M. Kunz, Esther Koller-Meier, Tomás Svoboda, Luc J. Van Gool, Since Lang, Kai Strehlke, Andrew Vande Moere, Oliver G. Staadt: "Bluec: a spatially immersive display and 3D video portal for telepresence", ACM Trans. Graph. 22(3), pp. 819-827, 2003). Here the collaborating person is located in a small room, a so-called cave. The environment and collaborators are projected in full 3D onto the walls of the room. Cameras record each person from multiple viewpoints such that it can be reproduced as a 3D model at a remote Blue-C installation. The Blue-C system provides a realistic immersive experience to the user, with a three-dimensional reproduction of collaborators, their gestures, mimicry, and other important stimuli. However, each cave can contain a single person only, the complete environment has to reproduced virtually, and it is impossible to integrate such a system into standard office spaces or more complex working environments due to the complex hardware and installation requirements.

Many of the technical restrictions of previous systems can nowadays be alleviated by new generations of high quality and high framerate cameras, TOF (time of flight) depth sensors, and advanced projectors and displays.

SUMMARY OF THE INVENTION

It is an object of the present invention to provide an autostereoscopic image display apparatus suitable for telepresence and telecollaboration applications that enables a realistic perception for an observer of a person or an object as if being present in the same room.

An apparatus according to the invention comprises a display layer and an image separation layer. The image separation layer is adapted to separate a displayed image on the display layer into a first image for a left eye of an observer and into a second image for a right eye of an observer so as to make the image display apparatus autostereoscopic. The apparatus comprises a display control module to activate the display layer and the image separation layer substantially only within a given two-dimensional silhouette so as to render the display layer and the image separation layer substantially transparent outside said silhouette.

The display layer will be substantially transparent as long as it is not activated. When activated, it stays essentially transparent outside the silhouette (perimeter) of the projected person or object. Transparent displays are known per se. The present invention provides such a display together with an image separation layer that is preferably substantially parallel to the display layer and that creates an autostereoscopic effect. In regions outside of the displayed silhouette, not only the display layer remains substantially transparent, but also the image separation layer which is responsible for the image separation into an image for the left eye and the right eye, respectively. The display layer and the image separation layer may be integrated in a flat display panel comprising these two layers.

In particular, the display control module may receive silhouette data representing the silhouette and will control the display layer and the image separation layer such that these layers are activated substantially only within the silhouette and remain substantially transparent outside of this silhouette. Furthermore, the apparatus may comprise an silhouette detection module adapted to receive image data and/or depth profile data of a person or object, to detect a two-dimensional silhouette from said data, and to transmit silhouette data to the display control module. The silhouette detection module may be implemented in software on a standard computer or on a dedicated processor. Algorithms for silhouette detection are known per se, e.g., from [Gross03] cited above and the references cited therein. These modules may be integrated in a single image processing device, or may be independent of each other or even remote from each other.

Generally speaking, the image separation layer is adapted to project the first image into a first direction and to project the second image into a second direction, the first and second directions being separated by an observation angle. The observation angle may be different locally for each image portion (e.g., for each pixel) and may thus vary across the image. In preferred embodiments, the image display apparatus comprises a means to dynamically adjust said observation angle during operation. The means may be operable electrically to receive directional data which directly or indirectly represents the desired observation angle, and to adjust the observation angle in accordance with the directional data. The observation angle will generally be larger for an observer closer to the image display apparatus and smaller for an observer further away from the image display apparatus. While known autostereoscopic displays require the observer to be positioned at a "sweet spot", so that the separated images for each of the two eyes of the observer are deflected appropriately to hit the observer's eye correctly, the present invention therefore provides the possibility of adapting itself to the observer's position relative to the image display.

The means to dynamically adjust said observation angle may in particular comprise at least one electromechanical actuator to control a distance between the display layer and the image separation layer, e.g., an electric motor based actuator or a piezo actuator. The means may alternatively or additionally comprise means for adapting the appearance of the image separation layer, e.g., by adapting the position and width of the lines of an active parallax barrier if the image separation layer comprises such an active parallax barrier.

The means to dynamically adjust the observation angle may be provided independently of whether or not the display layer and the image separation layer are activated substantially only within a given two-dimensional silhouette. The present invention therefore also generally relates to an image display apparatus comprising a display layer and an image separation layer, the image separation layer being adapted to separate a displayed image on the display layer into a first image projected into a first direction and into a second image projected into a second direction, the first and second direction for each image portion being separated by an observation angle, and the image display apparatus comprising a means to dynamically adjust said observation angle during operation.

In some embodiments, the display layer may comprise a transparent LED matrix for image generation. Such matrices are known per se. In particular, organic LED (OLED) matrices are known. In other embodiments, the display layer may be specifically adapted to be illuminated by a projection device and thus act as a projection layer. It may then comprise a transparent, anisotropically refracting or anisotropically reflecting material for this purpose.

The image separation layer may be adapted to generate an active parallax barrier having a plurality of substantially parallel lines on the image separation layer, preferably only within the two-dimensional silhouette, to separate the first and the second image. In some embodiments, the lines may be substantially vertical; however, in other embodiments, the lines may have different orientations, e.g., diagonal. In some embodiments, the image separation layer may comprise an LCD to generate the active parallax barrier, in particular, a black-and-white LCD providing high contrast. In other embodiments, the image separation layer may comprise a lenticular lens system matrix to separate the first and the second image.

The image display apparatus may further comprise a robotic unit on which the display layer and image separation layer are mounted, allowing translational and rotational motion of the image display apparatus on a floor in the same room or space as the observer. The apparatus may additionally comprise at least one anti-collision sensor, e.g. an ultrasonic sensor or an infrared (IR) sensor, to avoid collision of the image display apparatus with other objects, in particular with observers or other image display apparatuses that are located or that are moving on the floor.

The robotic unit may be provided independently of whether or not the display layer and the image separation layer are activated substantially only within a given two-dimensional silhouette. The present invention therefore also relates to an image display apparatus comprising a display layer and an image separation layer, wherein the image separation layer is adapted to separate a displayed image on the display layer into a first image for a left eye of an observer and into a second image for a right eye of an observer so as to make the image display apparatus autostereoscopic, the apparatus further comprising a robotic unit that allows for translational and rotational motion of the image display apparatus on a floor.

The image display apparatus may be equipped with image and depth sensors, such as a stereo camera system and time of flight sensors, respectively. Then, one person's image and depth data can be captured at a first location and transmitted and displayed at a second location. At this second location, an the image and depth data of an observer of the display is captured in the same way and transmitted to the first location, where this data is observed by the original person. In this way, the person and the observer will have a very realistic perception of telepresence of each other's counterpart. In particular, the image display apparatus may comprise one or more cameras for capturing a plurality of simultaneous images of a person or other object, and an image-processing unit to synthesize separate images for the left and right eyes of a virtual observer from said plurality of simultaneous images. The apparatus may further comprise at least one depth sensor, preferably a time-of-flight sensor, that is capable of measuring a distance between the image display apparatus and an observer or an object in its surroundings.

In principle, one can envisage having a multitude of observers and such image display apparatuses in the same room (first location). A copy of this room is generated at a second location, only that the image display apparatuses at the first location are persons that are present at this second location, and the really present persons and objects at the first location are replaced by corresponding image display apparatuses at this second location. This concept can, of course, be expanded to more than two locations at the same time.

The apparatus may comprise at least one additional image separation layer. The additional image separation layer may be arranged on the back side of the display layer that faces away from the first image separation layer. In this manner, the apparatus may be viewed from both sides, e.g., to display the front and the back of a person or object. In addition or in the alternative, an additional image separation layer may be arranged on top of the first, image separation layer, i.e., on that side of the first image separation layer that faces away from the display layer. In this manner, the apparatus may be used to deliver autostereoscopic images to more than one observer. This concept can be of course generalized to several additional image separation layers. Preferably, the display control module is adapted to activate also the additional image separation layers substantially only within a given two-dimensional silhouette so as to render the display layer and the plurality of image separation layers substantially transparent outside said silhouette. Means may be provided to dynamically adjust the observation angle not only for the first image separation layer, but independently also for at least one of the additional image separation layers.

While the apparatus has been described as being particularly suited for telepresence and telecollaboration applications, its range of application is not limited thereto, and the apparatus may also be used in other contexts.

In another aspect, the present invention provides a method of displaying a person or object to an observer, the method comprising the following steps:
  providing an image display apparatus having a transparent display layer and an image separation layer;
  providing image data of the person or object and silhouette data representing a two-dimensional silhouette of the person or object;
  displaying images of the person or object on the display layer for the left and right eyes of the observer, based on the image data, such that the display layer is only active within the silhouette, and that the display layer is left essentially transparent in regions outside that silhouette; and
  controlling the image separation layer to separate the displayed images on the display layer into a first image for a left eye of the observer and into a second image for a right eye of the observer so as to make the image display apparatus autostereoscopic, the image separation layer being only active within the silhouette and being essentially transparent in regions outside that silhouette.

The method may further comprise the steps of:
  capturing the image data with at least two separate cameras, preferably a stereo image with a stereo camera system;
  capturing depth profile data of the person or object from a reference position, e.g., with at least one depth sensor, preferably with at least one time of flight sensor;
  detecting the silhouette data from the captured image data and depth profile data; and
  displaying the images of the person or object in a way that its perspective to the observer corresponds to the perspective of the captured person or object from the reference position.

In yet another aspect, the present invention provides a method of displaying a person or object to an observer, the method comprising the following steps:
  providing an image display apparatus having a display layer and an image separation layer;
  displaying images of the person or object on the display layer for the left and right eyes of the observer;
  controlling the image separation layer to separate the images on the display layer into a first image for a left eye of the observer and into a second image for a right eye of the observer so as to make the image display apparatus autostereoscopic, whereby the first image is projected into a first direction and the second image is projected into a second direction, the first and second direction being separated by an observation angle, and
  dynamically adjusting said observation angle.

In particular, this method may comprise the steps of:
  capturing distance data between the image display apparatus and the observer, preferably by an additional time of flight sensor associated with the image display apparatus;
  estimating a spatial position of the observer's eyes relative to the image display apparatus;
  dynamically adjusting said observation angle dependent on the estimated spatial position of the observer's eyes.

Adjustment of the observation angle may be achieved by adjusting any of the following parameters:
  distance between the display layer and the image separation layer, as described above; and
  appearance of the image separation layer, e.g., line width and/or line position in the case of an active parallax barrier, as described above.

In the alternative or in addition, the method may comprise adjusting the distance between the apparatus and the observer by moving the apparatus, to match the observation angle.

These methods may of course be combined with the above-described method wherein the image display apparatus remains substantially transparent outside a silhouette.

In yet another aspect, the present invention provides a method of displaying a person or object to an observer, the method comprising the following steps:
  providing an image display apparatus having a display layer and an image separation layer;
  displaying images of the person or object on the display layer for the left and right eyes of the observer;
  controlling the image separation layer to separate the images on the display layer into a first image for a left eye of the observer and into a second image for a right eye of the observer so as to make the image display apparatus autostereoscopic; and
  moving the image display apparatus by a robotic unit.

In particular, this method may comprise:
  capturing image data of the person or object with at least two separate cameras, preferably a stereo image with a stereo camera system, from a reference position;
  moving the image display apparatus by the robotic unit so that the position of the image display apparatus relative to the observer is essentially continuously matching the position of the person or the object that was captured relative to the reference position; and
  displaying the images of the person or object, based on the image data; in a way that the perspective from the observer onto the images corresponds to the perspective from the reference position onto the captured person or object.

Again, the features of these methods may be combined with any of the other above-described methods. These methods may be implemented as methods of operating an image display apparatus as described above.

In a particularly preferred embodiment, a method of displaying a person or object to an observer having the following features is provided:

a. capturing image data of the person or object with at least two separate cameras, preferably a stereo image with a stereo camera system;

b. capturing depth profile data of the person or object and its surroundings from a reference point with at least one depth sensor, preferably with at least one time of flight sensor;

c. transmitting the captured image data and depth profile data to an image display apparatus;

d. before or after step (c), detecting a silhouette of the person or object from the captured image data and depth profile data by an image recognition module;

e. capturing distance data between the image display apparatus and the observer, preferably by an additional time of flight sensor associated with the image display apparatus;

f. estimating a spatial position of the observer's eyes from the distance data;

g. synthesizing scaled images of the person or object on a transparent display layer of the image display apparatus separately for the left and right eyes of the observer in a way that its perspective to the observer corresponds to the perspective of the captured person or object from the reference point, that the display layer is only active within the perspectively adjusted and scaled silhouette, and that the display layer is left essentially transparent in regions outside that silhouette; and h. controlling an image separation layer of the image display apparatus to generate an active parallax bather, such that the bather is only active within the perspectively adjusted and scaled silhouette and that the image separation layer is left essentially transparent in regions outside that silhouette.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

A. OLED display and LCD Parallax Barrier

Figure 1:
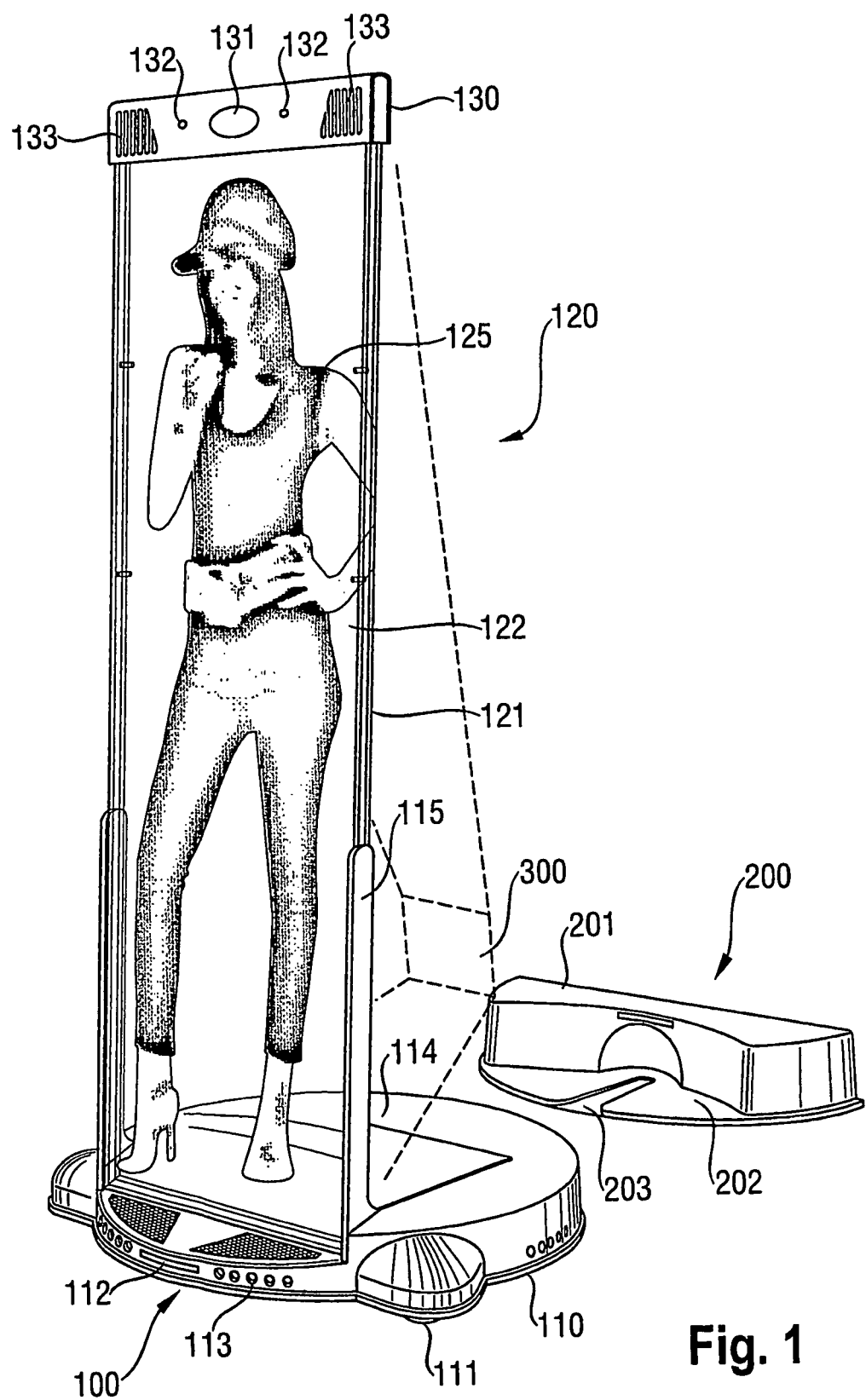
FIG. 1 shows an autostereoscopic, transparent display platform for mobile telepresence according to the invention.
Figure 2:
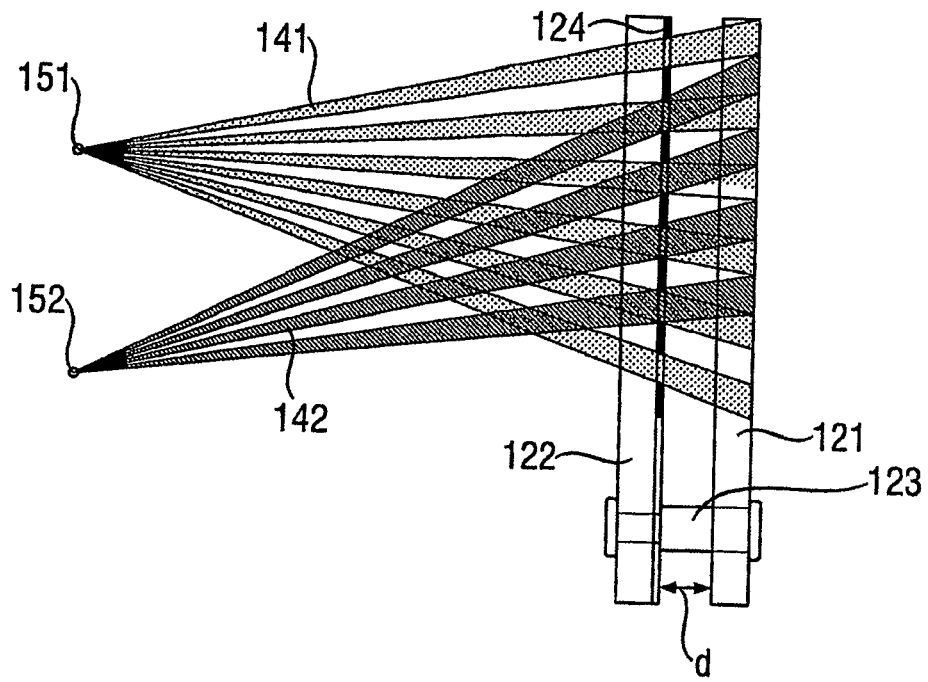
FIG. 2 shows an illustration of dynamic distance control between the parallax barrier (frontal display) and the transparent OLED.
Figure 3:
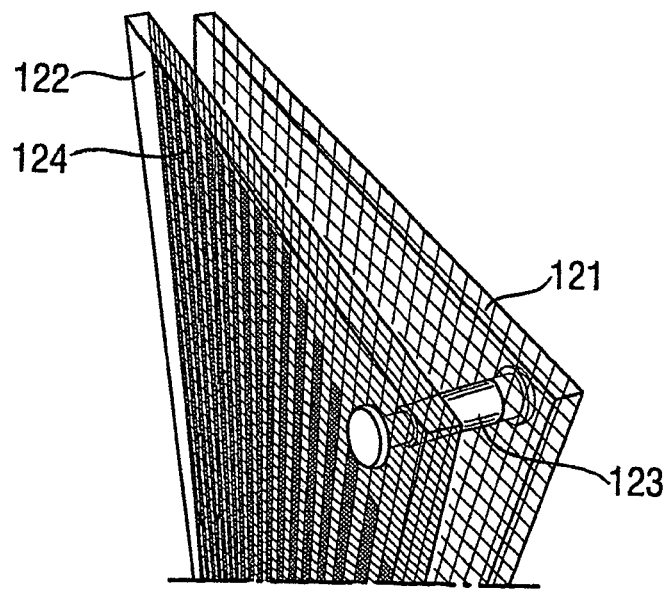
FIG. 3 illustrates dynamic switching of the parallax bather (black vertical lines) within the silhouette of the object to be displayed.

In FIGS. 1-3, an embodiment of an image display apparatus 100 according to the present invention is illustrated. The image display apparatus comprises a flat, transparent display panel 120 mounted on a robotic platform 110 by means of a panel holder 115. On top of the display panel 120, an upper part 130 is mounted.

The display panel 120 comprises a display layer 121 in the form of a transparent organic light emitting diodes (OLED) self-illuminating display (obtainable, e.g., from Samsung) and an image separation layer 122 in the form of a transparent high-resolution black-and-white LCD (liquid-crystal display) for dynamic beam separation by generating a parallax bather 124 (see FIGS. 2 and 3).

The underlying idea is as follows: In order to provide a 3D view of a person, two distinct views are rendered separately for the two eyes of the viewer. These two views may be rendered on the OLED display, e.g. in a column-interleaved fashion. This design is augmented by two further, independent aspects: first, the distance d between the display layers 121, 122 and the appearance of the parallax bather 124 generated by the LCD are controlled in real-time to accommodate the distance and position of the viewer with respect to the display. The variable distance control is accomplished by mechanically active actuators 123 (FIGS. 2 and 3), e.g., piezo actuators. Second, the LCD parallax barrier 124 is only active within the silhouette 125 of the person to by displayed. This partial barrier guarantees that all display area outside the silhouette will stay transparent and the resulting image seamlessly integrates into the real environment.

Given the position of a viewer it is then possible to use the frontal LCD as a barrier such that the left eye 151 sees only the left view 141 rendered on the display, and the right eye 152 sees only the right view 142. Due to the full transparency in non-illuminated areas of the combined OLED/LCD display panel, the visualized person will appear to float in the air, and an observer will be able to see the background around the collaborator's silhouette.

B. Cameras, Depth Sensors, and Real-Time Processing

In order to create a 3D stereoscopic representation of the remote person, cameras 132 and one or more additional time-of-flight (TOF) depth sensors 131 acquire color and depth imagery in real-time. Loudspeakers 133 and microphones (not shown) may be provided for speech transmission.

The video from the two color cameras 132 is being utilized to compute stereo cues. In addition, the TOF sensor 131 captures a lower resolution depth map from the person. This depth map is utilized to correct for gaze and eye contact and to render perspectively correct image streams.

In addition, the TOF sensor 131 allows one to reliably compute the distance and position of the remote viewer from the display panel 120. This information is utilized for the closed-loop algorithm that controls the distance between the two display layers 121, 122 and that controls the parallax barrier 124 on the LCD. The resulting data may further be transmitted between two or more of such platforms or, alternatively, to a telepresence location. As a second mode of operation, the display may also support multi-viewpoint video, such that multiple viewers can get a perspectively correct image at the same time. For such modes, a more accurate 3D model proxy of the remote person is computed and rendered separately for each desired view. The optical separation between the individual views can also be accomplished by the parallax bather.

C. Mobile Robotics Platform

The display, the cameras and depth sensors, and all other hardware components such as processors, hardware-controllers and power-supplies (generally speaking, a control unit 114, including a display control module for controlling the display panel 120) are mounted onto a mobile, battery-driven, partly autonomous holonomic robotics platform 110 having driven wheels 111. The platform 110 is equipped with additional ultrasonic distance and motion sensors 113 to allow the system to move freely in the available office or working environment without collisions. A "billboard" mode may be implemented wherein the display apparatus 100 moves and turns to the actual communication partner. A status display 112 indicates the status of the apparatus.

A docking station 200 may be provided for recharging the batteries of the platform 110 (see FIG. 1). In the present embodiment, the docking station 200 with main body 201 has a flat base 202 with a wheel guide 203 for guiding the platform 110 into the correct position on the docking station 200.

The design of the robotics part will have to consider safety issues as well. Besides a desired autonomous mode of operation, interactive control of the platform 110 by the remote user through an intuitive user interface may be provided.

D. Alternative Embodiments of the Invention

Many alternative embodiments are possible without leaving the scope of the invention, and the invention is by no means limited to the preferred embodiment described above.

By the way of example, it is possible to use a lenticular lens system instead of a dynamic parallax barrier to separate the two images for each of the observer's eyes. Another way to achieve the adaptation to the distance of the observer to the display could be to modify the width of the vertical lines of the parallax barrier, if such is used. The parallax barrier itself can be realized by LCD, OLED, video projection or any other means that yields the required resolution.

Instead of OLEDs for the display, an anisotropically refracting or anisotropically reflecting material may be used, which is illuminated by an external video projector, such as the projector 300 schematically illustrated in dashed lines in FIG. 1. The projector may, for instance, be hidden in the foot of the device that also comprises the robotic unit. Many further embodiments are possible.

The invention claimed is:

1. A method of displaying a person or object to an observer, the method comprising the following steps:
   providing an image display apparatus having a transparent display layer and an image separation layer;
   capturing image data of the person or object with at least two separate cameras;
   capturing depth profile data of the person or object from a reference position;
   detecting, from the captured image data and the depth profile data, silhouette data representing a two-dimensional silhouette of the person or object;
   displaying images of the person or object on the display layer for the left and right eyes of the observer, based on the image data, such that the display layer is only active within the silhouette, and that the display layer is left essentially transparent in regions outside that silhouette; and
   controlling the image separation layer to separate the displayed images on the display layer into a first image for a left eye of the observer and into a second image for a right eye of the observer so as to make the image display apparatus autostereoscopic, the image separation layer being only active within the silhouette and being essentially transparent in regions outside the silhouette;
   wherein the images of the person or object are displayed in a way that its perspective to the observer corresponds to the perspective of the captured person or object from the reference position.

2. The method of claim 1, wherein the first image is projected into a first direction and the second image is projected into a second direction, the first and second direction for each image portion being separated by an observation angle, the method further comprising dynamically adjusting said observation angle.

3. The method according to claim 2, further comprising the steps of: capturing distance data between the image display apparatus and the observer; estimating a spatial position of the observer's eyes relative to the image display apparatus; and dynamically adjusting said observation angle dependent on the estimated spatial position of the observer's eyes.

4. The method of claim 1, further comprising: moving the image display apparatus by a robotic unit.

5. The method of claim 4, comprising: capturing image data of the person or object from a reference position with at least two separate cameras; moving the image display apparatus by the robotic unit so that the position of the image display apparatus relative to the observer is essentially continuously matching the position of the person or the object that was captured relative to the reference position; and displaying the images of the person or object, based on the image data, in a way that the perspective from the observer onto the images corresponds to the perspective from the reference position onto the captured person or object.

6. A method of displaying a person or object to an observer, the method comprising the following steps:
   providing an image display apparatus having a display layer and an image separation layer;
   capturing distance data between the image display apparatus and the observer;
   estimating a spatial position of the observer's eyes relative to the image display apparatus;
   displaying images of the person or object on the display layer for the left and right eyes of the observer;
   controlling the image separation layer to separate the images on the display layer into a first image for a left eye of the observer and into a second image for a right eye of the observer so as to make the image display apparatus autostereoscopic, whereby the first image is projected into a first direction and the second image is projected into a second direction, the first and second direction for each image portion being separated by an observation angle; and
   dynamically adjusting said observation angle dependent on the estimated spatial position of the observer's eyes.

7. A method of displaying a person or object to an observer, the method comprising the following steps:
   providing an image display apparatus having a display layer and an image separation layer;
   capturing image data of the person or object from a reference position with at least two separate cameras;
   moving the image display apparatus by the robotic unit so that the position of the image display apparatus relative to the observer is essentially continuously matching the position of the person or the object that was captured relative to the reference position;
   displaying images of the person or object on the display layer for the left and right eyes of the observer, based on the image data, in a way that the perspective from the observer onto the images corresponds to the perspective from the reference position onto the captured person or object;
   controlling the image separation layer to separate the images on the display layer into a first image for a left eye of the observer and into a second image for a right eye of the observer so as to make the image display apparatus autostereoscopic.

* * * * *